United States Patent
Vyas et al.

(10) Patent No.: US 11,438,301 B1
(45) Date of Patent: Sep. 6, 2022

(54) SYSTEMS AND METHODS FOR LOCATION-BASED ASSIGNMENT OF NETWORK ADDRESS INFORMATION

(71) Applicant: Verizon Patent and Licensing Inc., Basking Ridge, NJ (US)

(72) Inventors: Sanjay Ravi Vyas, Hyderabad (IN); Jebaraj Daniel Kennet Jeyakumar, Apex, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/397,567

(22) Filed: Aug. 9, 2021

(51) Int. Cl.
*H04L 61/50* (2022.01)
*H04L 45/74* (2022.01)

(52) U.S. Cl.
CPC ............. *H04L 61/20* (2013.01); *H04L 45/74* (2013.01)

(58) Field of Classification Search
CPC ............................... H04L 61/20; H04L 45/74
USPC .......................................................... 709/238
See application file for complete search history.

(56) References Cited

U.S. PATENT DOCUMENTS

| | | | |
|---|---|---|---|
| 2005/0018645 A1* | 1/2005 | Mustonen | H04W 4/02 370/349 |
| 2005/0262218 A1* | 11/2005 | Cox | H04L 61/2015 709/217 |
| 2008/0008179 A1* | 1/2008 | Chen | H04W 4/20 370/392 |
| 2013/0121207 A1* | 5/2013 | Parker | G06Q 30/06 370/254 |
| 2018/0176077 A1* | 6/2018 | Kanakarajan | H04L 9/005 |
| 2021/0021474 A1* | 1/2021 | Li | H04L 61/2061 |

* cited by examiner

*Primary Examiner* — James E Springer (57) ABSTRACT

In some implementations, a router device may identify a network address assignment event. The router device may determine first location information for a deployment site of the router device based on identifying the network address assignment event. The router device may convert the first location information into second location information. The router device may identify a block of network addresses, of a group of blocks of network addresses, corresponding to a region of a set of defined regions. The router device may select, from the block of network addresses, an available network address for the router device. The router device may assign the available network address to an interface of the router device. The router device may enable routing using the interface based on assigning the available network address to the interface.

20 Claims, 7 Drawing Sheets

100 ⟶

Network 115

150
Identify network address assignment event

Router Device
105

152
Detect router location (geographic location and region)

User Device(s)
110

SYSTEMS AND METHODS FOR LOCATION-BASED ASSIGNMENT OF NETWORK ADDRESS INFORMATION

BACKGROUND

A network (e.g., a mobile network) may be distributed over coverage areas or sites that can extend over a wide geographic area and enable a large number of portable transceivers (e.g., computers, smart phones, Internet-of-Things (IoT) devices, and/or other mobile devices) to communicate. A site of a network may include a number of network devices (e.g., baseband units, base stations, routers, modems, switches, gateways, access points, and/or other network devices) that enable the portable transceivers to connect to the network.

DETAILED DESCRIPTION OF PREFERRED EMBODIMENTS

The following detailed description of example implementations refers to the accompanying drawings. The same reference numbers in different drawings may identify the same or similar elements.

As reliance on wireless communications becomes more widespread and as network traffic continues to increase, network operators pay closer attention to network usage and performance to ensure that associated network infrastructure can support growing demands. Network operators may monitor network analytics data relating to different coverage areas or sites within a network, and design site plans to add a node or a network device (e.g., a baseband unit, a base station, a router, a modem, a switch, a gateway, an access point, and/or another network device) associated with a target site needing support. The process of adding or provisioning a network device may involve several steps.

The current installation process can be cumbersome, time-consuming, and prone to error and delay, especially when there are multiple router devices to provision at multiple different locations. One step of a provisioning process is the assignment of network addresses to a router device to enable the router device to perform routing functionalities. Current provisioning processes do not provide data assurance measures to ensure that a set of network addresses assigned to a router device is optimized to reduce network traffic associated with routing. This can be a concern especially for modern networks (e.g., 4G networks, 5G networks, New Radio (NR) networks, and/or the like) in which network topology may be regularly changing, resulting in it being advantageous to maintain precise optimization of network address assignment.

Some implementations described herein enable a router device to automatically self-provision with a set of network addresses to enable rapid deployment and reconfiguration of router devices. At an installation occurrence or a reconfiguration occurrence, the router device may determine parameters, such as a location associated with the router device, a template for assigning network addresses, or an availability of a set of network addresses, among other examples. Based on the parameters, the router device may assign a set of network addresses, such as a set of Internet Protocol (IP) addresses to, for example, a set of interfaces and may mark the set of network addresses as having been assigned to avoid a conflict with another router device assigning the set of network addresses. In this way, the router device may use location information regarding the router device to assign network addresses from, for example, a pool of network addresses associated with a location of the router device, thereby ensuring that interfaces of the router device belong to the same subnet as other interfaces of other router devices located near to the router device. This causes routing between interfaces of nearby router devices to occur with less network overhead, thereby reducing network congestion.

Moreover, based on using router devices to automatically assign network addresses and mark assigned network addresses, the router devices avoid conflicts where multiple router devices may independently assign the same network addresses, thereby resulting in dropped packets and poor network performance. Furthermore, the router devices enable network operators to complete new builds and/or upgrades in less time and maintain associated network equipment and/or user equipment in optimal operating condition. The router devices additionally conserve computational and network resources that network operators may otherwise use to provision a network device.

Figure 1A:
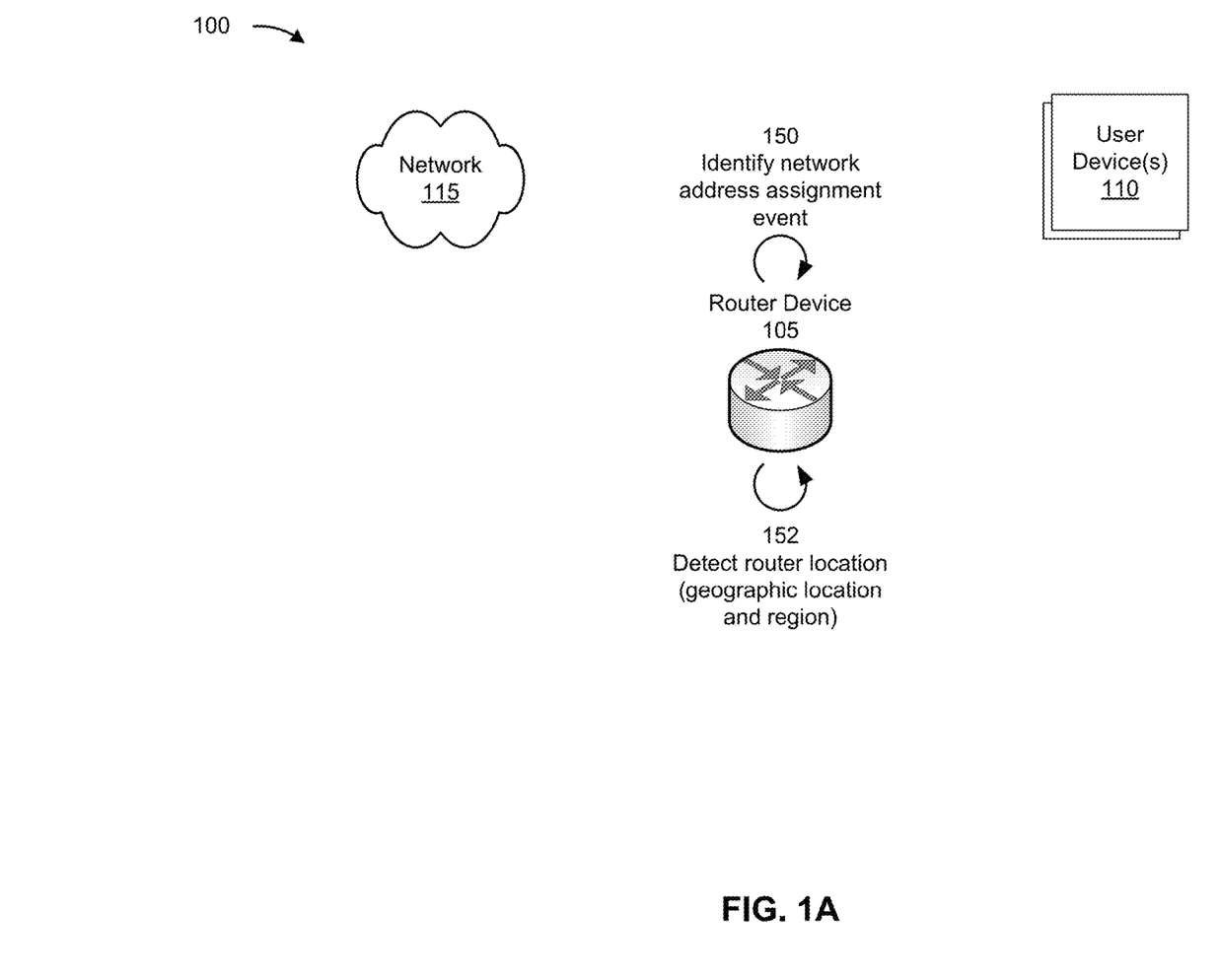
FIGS. 1A-1C are diagrams of an example associated with location-based assignment of network address information.
Figure 1B:
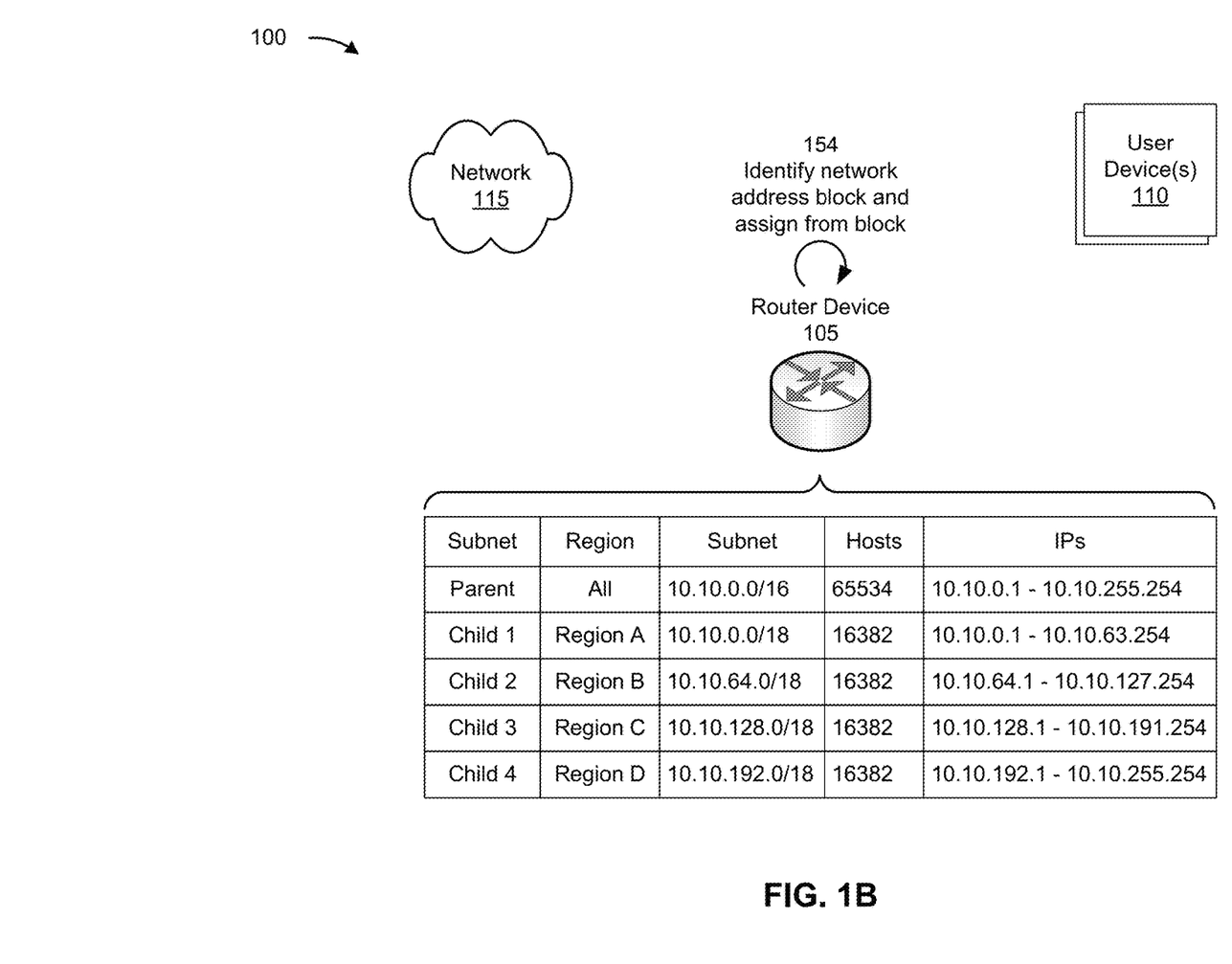
Figure 1C:
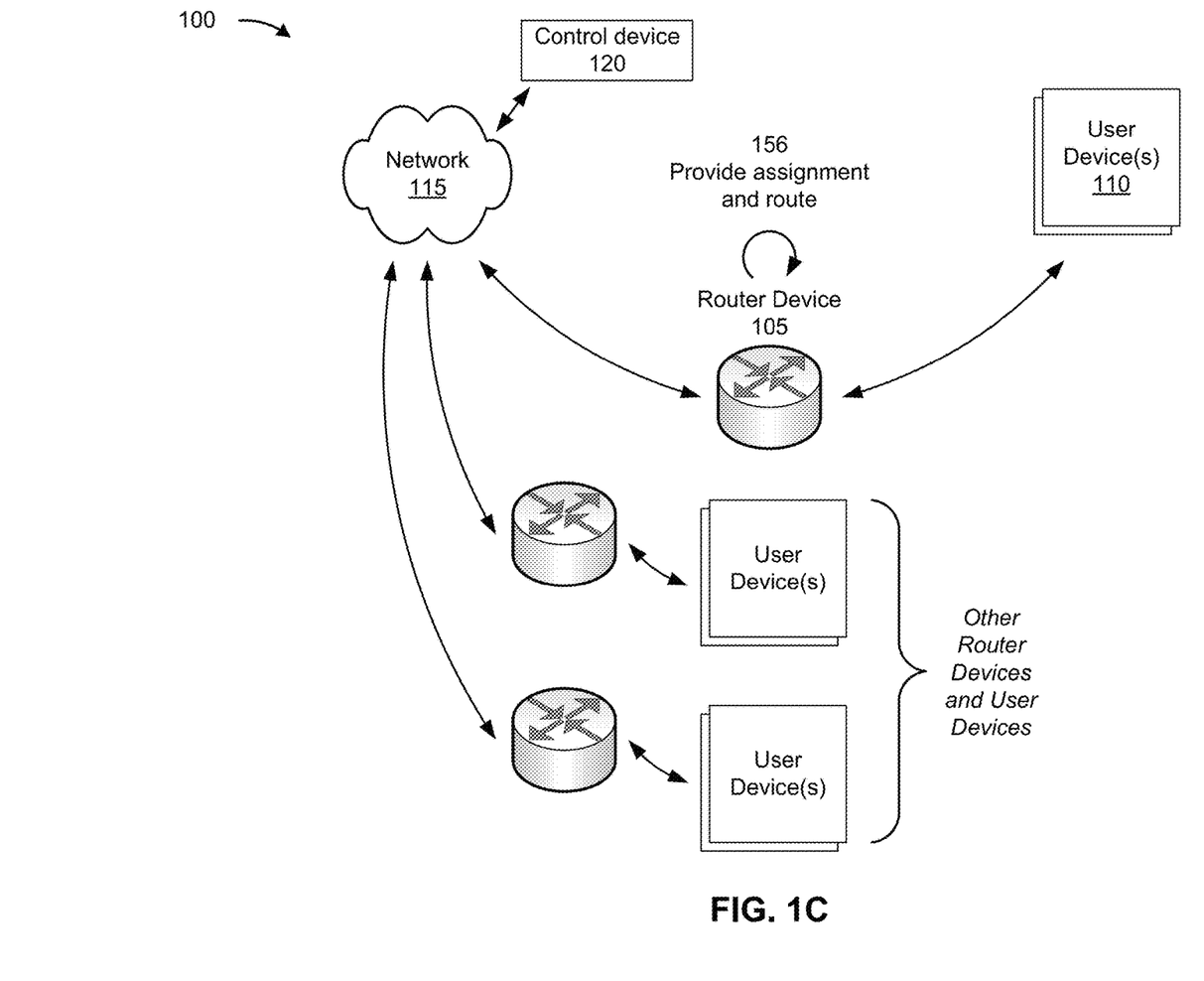

FIGS. 1A-1C are diagrams of an example 100 associated with location-based assignment of network address information. As shown in FIGS. 1A-1C, example 100 includes a router device 105, one or more user devices 110, and a network 115.

As further shown in FIG. 1A, and by reference number 150, router device 105 may identify a network address assignment event. For example, when router device 105 is initially installed at a site, router device 105 may determine to initiate network address assignment. In this case, network address assignment may include IP assignment for deployment of co-located router devices (e.g., cell-site routers (CSRs) with common location information) or IP assignment for deployment of virtualized radio access networks (vRANs) (e.g., network slicing), among other examples. Additionally, or alternatively, router device 105 may initiate network address assignment when router device 105 is moved from a first location to a second location. In some implementations, router device 105 may have a dynamic interface configuration and may identify a network address assignment when the dynamic interface configuration changes. For example, router device 105 may have a set of interfaces (e.g., routing ports), but may only use a subset of the set of interfaces at any time. In this case, when router device 105 changes from using a first subset of interfaces (e.g., which is assigned a first set of network addresses) to using a second subset of interfaces (e.g., some of which have not been assigned network addresses), router device 105 may initiate network address assignment to assign network addresses to the second subset of interfaces. In another example, when router device 105 has additional interfaces installed (e.g., a hardware expansion of router device 105), router device 105 may initiate network address assignment to assign network addresses to the additional interfaces.

As further shown in FIG. 1A, and by reference number 152, router device 105 may detect a router location. For example, router device 105 may use a geolocation procedure to detect the router location (e.g., a location of a deployment site of router device 105). The geolocation procedure may include identifying first location information, such as a coordinate location in a coordinate location system (e.g., a latitude and longitude) and converting the first location information into second location information, such as a region. Router device 105 may determine the coordinate location using, for example, a geolocation component, such as a global positioning system (GPS) component. Additionally, or alternatively, router device 105 may determine the coordinate location by communicating with one or more other devices. For example, router device 105 may use Bluetooth or Near Field Communication (NFC), among other examples, to communicate with another device that has access to location information (e.g., a user device used by an installation technician or another router device within a threshold proximity of router device 105). In some aspects, router device 105 may determine the coordinate location based at least in part on a site identifier. For example, router device 105 may determine a common language location identifier (CLLI) code or a local access and transport area (LATA) parameter associated with a site at which router device 105 is deployed. In this case, router device 105 may determine the CLLI code or LATA parameter based on stored information, configuration information received from a user device of an installation technician, or communication with one or more devices (e.g., via Bluetooth or NFC), among other examples. Additionally, or alternatively, router device 105 may access a communication network and may query one or more other devices on the communication network to receive a CLLI code, LATA parameter, or other location identifier.

In some implementations, based on determining first location information identifying a location of a site, router device 105 may convert the first location information into second location information. For example, router device 105 may map a CLLI code or LATA parameter to a defined region of a set of defined regions. The set of defined regions may correspond to a group of subsets of network addresses associated with a subnet. In another words, network addresses, such as IP addresses, may have multiple logical subdivisions termed subnets and each subnet may be associated with a corresponding region. As a particular example, router device 105 may determine that router device 105 is deployed at a location with a CLLI code indicating a location in Trenton, N.J., USA and may map the location in Trenton, N.J., USA to a region associated with a subnet assigned for New Jersey, USA.

As shown in FIG. 1B, and by reference number 154, router device 105 may identify a network address block and assign network addresses from the network address block. For example, based on identifying a region in which router device 105 is deployed, router device 105 may identify a network address block (which may also be termed a "network address pool"), such as a subnet, associated with the region. In this case, as shown, a parent network may be divided into four child subnets 1-4 and each child subnet may correspond to a different region A-D. Although some implementations are described in terms of a quantity of subnets and a corresponding quantity of regions, other quantities of subnets or regions may be possible, such as four subnets corresponding to three regions (e.g., two subnets covering one region), 10 subnets corresponding to 20 regions (e.g., each subnet covering two regions), among other examples.

In some implementations, router device 105 may receive information identifying a parent network and one or more region-associated subnets. For example, a control device (not shown) may determine a set of regions in which a set of router devices 105 are to be deployed and may divide a parent network into a set of region-associated subnets. In this case, the control device may provide information identifying the set of region-associated subnets to the router device 105 (e.g., via network 115). Additionally, or alternatively, router device 105 may communicate with the control device to request a division of the parent network. For example, router device 105 may determine that router device 105 is being deployed in a new region without a region-associated subnet, and may request that the control device subdivide the parent network to create a region-associated subnet for the router device 105 and/or other router devices 105 in the same region. Additionally, or alternatively, router device 105 may request that the control device subdivide a child subnet (a region-associated subnet) into multiple child subnets (multiple region-associated subnets) based on a quantity of router devices or other network devices deployed on the child subnet. In some implementations, the router device 105 may be the control device (e.g., the router device 105 may manage division or subdivision of the parent network or the child subnets. In this way, by dividing the parent network and/or subdividing a child subnet, router device 105 improves routing efficiency relative to using, for example, an arbitrary division of subnets.

The parent network may be assigned a network address (e.g., 10.10.0.0/16) with a quantity of hosts (e.g., 65534 hosts) and each subnet may be assigned a subnet address with a subset of the quantity of hosts. For example, Child 1/Region A may have a subnet address of 10.10.0.0/18 with 16,382 hosts (e.g., one quarter of hosts of the parent network), Child 2/Region B may have a subnet address of 10.10.64.0/18 with 16,382 hosts (e.g., one quarter of hosts of the parent network), Child 3/Region C may have a subnet address of 10.10.128.0/18 with 16,382 hosts (e.g., one quarter of hosts of the parent network), and Child 4/Region D may have a subnet address of 10.10.192.0/18 with 16,382 hosts (e.g., one quarter of hosts of the parent network). Each child subnet may also be assigned a block of network addresses, such as a range of consecutive IP addresses, from a group of blocks of network addresses. For example, the parent network may have a range of IP addresses from 10.10.0.1-10.10.255.254 and each child network may have a subset of consecutive IP addresses within the range of IP addresses, such as Child 1/Region A having IP addresses 10.10.0.1-10.10.63.254, Child 2/Region B having IP addresses 10.10.64.1-10.10.127.254, Child 3/Region C having IP addresses 10.10.128.1-10.10.191.254, and Child 4/Region D having IP addresses 10.10.192.1-10.10.255.254. In this case, router device 105 may store information identifying subnets and associated parameters (e.g., associated hosts, IP addresses, etc.) or may communicate with another device, such as a centralized address assignment server to obtain the information identifying the subnets and associated parameters.

Based on identifying a network address block, such as a set of IP addresses assigned to a subnet corresponding to a location of router device 105, router device 105 may assign network addresses to interfaces (e.g., associated with user devices 110) from the network address block. For example, router device 105 may assign IP addresses to interfaces of router device 105. In some implementations, router device 105 may use a network address assignment template to assign IP addresses. A network address assignment template may define an assignment pattern of network addresses (e.g., sequential assignment or non-sequential assignment, among other examples) to interfaces of router device 105.

Router device 105 may determine whether a template is defined for assigning IP addresses to interfaces of router device 105. The template may include information indicating one or more parameters associated with router 105, such as whether IP version 4 (IPv4) or IP version 6 (IPv6) addresses are to be used with one or more interfaces of router 105, a quantity of interfaces that router 105 is to use, a type of device (e.g., firewalls switches, hubs, etc.) that is to be connected to each interface of router 105, a location of router 105, or a network topology or architecture connected to router device 105, among other examples. Router device 105 may determine whether the template is defined based on a type or configuration of router device 105 and/or interfaces thereof (e.g., whether a template is defined for cell-site routers or non-fixed routers, among other examples). In this case, if the template is defined (and stored by router device 105 or obtainable by router device 105 via a network), router device 105 may use the template and the identified subnet to assign IP addresses. Alternatively, if the template is not defined (e.g., not stored or obtainable by router device 105), router device 105 may create a router-specific template for router device 105, which router device 105 may use to assign IP addresses and may store to enable subsequent IP address assignment using the router-specific template.

In some implementations, router device 105 may assign network addresses using an assignment pattern. For example, router device 105 may assign IP addresses to each interface of router device 105 sequentially in order of an interface identifier of each interface. In this case, router device 105 may validate each network address as an available network address before completing an assignment of a network address. For example, router device 105 may assign an IP address to an interface, validate that the IP address has not been assigned to another interface, and, if the IP address is invalid (e.g., a network address is unavailable for assignment), router device 105 may select another IP address to attempt to assign to the interface. In some implementations, to validate a network address, router device 105 may identify a log file of one or more assignments of one or more network addresses (at a prior time), and may select a network address based on a content of the log file (e.g., which network addresses are available or unavailable).

As shown in FIG. 1C, and by reference number 156, router device 105 may provide information identifying the assignment of network addresses and may route network traffic. For example, router device 105 may provide an identification of the assignment of IP addresses to interfaces to network 115 and/or a control device 120 thereof or to a user device 110 that is attempting to access network 115 via router device 105. In some implementations, router device 105 may store a record of the network address assignment. For example, router device 105 may store an IP record (e.g., mark the IP record in a log file) indicating an assignment of an IP address to an interface to enable subsequent validation procedures, as described herein, to determine an assignment of the IP address to another interface to be invalid. Additionally, or alternatively, router device 105 may register a record (e.g., an IP record) with, for example, control device 120 by transmitting information to control device 120 identifying an assignment of a network address to an interface.

In some implementations, router device 105 may store location information in connection with the record of the network address assignment, such as storing a CLLI code or LATA parameter to enable locating and tracking of router device 105, interfaces thereof, and/or other devices (e.g., user devices 110) associated therewith. Based on providing the identification of the assignment of IP addresses to interfaces, router device 105 may enable routing of network traffic (e.g., in a co-located CSR deployment or a vRAN deployment, among other examples), such as between user devices 110, network 115, and other router devices associated with other user devices. Additionally, or alternatively, router device 105 may enable visualization and tracking of connected devices for network management using the records of IP address assignment and associated location information. For example, router device 105 may report information associated with a template for router device 105, such as a network topology or architecture associated with router device 105, a quantity of network devices connected to router device 105, a type of each network device connected to router device 105, or a location of router device 105 and/or one or more network devices connected to router device 105, among other examples.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
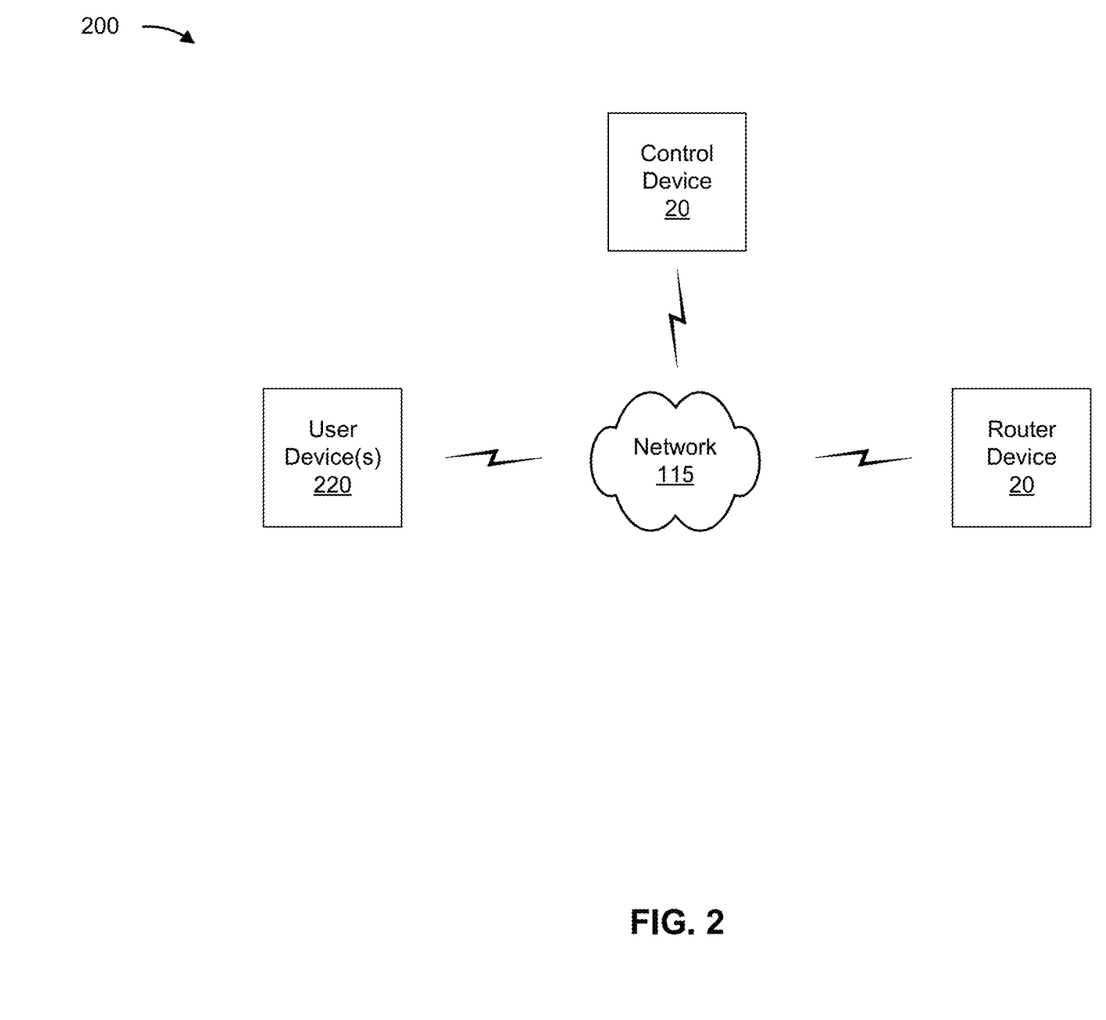
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a router device 210, a user device 220, a control device 230, and a network 240. Devices of environment 200 may interconnect via wired connections, wireless connections, or a combination of wired and wireless connections.

The router device 210 includes one or more devices capable of receiving, processing, storing, routing, and/or providing traffic (e.g., a packet and/or other information or metadata) in a manner described herein. For example, the router device 210 may include a router, such as a label switching router (LSR), a label edge router (LER), a cell-site router (CSR), an ingress router, an egress router, a provider router (e.g., a provider edge router or a provider core router), a virtual router, or another type of router. Additionally, or alternatively, the router device 210 may include a gateway, a switch, a firewall, a hub, a bridge, a reverse proxy, a server (e.g., a proxy server, a cloud server, or a data center server), a load balancer, and/or a similar device. In some implementations, the router device 210 may be a physical device implemented within a housing, such as a chassis. In some implementations, the router device 210 may be a virtual device implemented by one or more computing devices of a cloud computing environment or a data center. In some implementations, a group of router devices 210 may be a group of data center nodes that are used to route traffic flow through a network. In some implementations, router device 210 may have a geolocation function for determining a location of a deployment site of router device 210 and/or a change to a location of router device 210.

The user device 220 includes one or more devices capable of receiving, generating, storing, processing, and/or providing network traffic that is to be routed via router device 210, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The control device 230 includes one or more devices capable of receiving, generating, storing, processing, and/or providing information associated with network address assignment and routing of traffic, as described elsewhere herein. For example, the control device 230 may include a device capable of providing location information, information identifying network addresses, information indicating whether one or more network addresses are available for assignment or unavailable for assignment, or information associated with tracking one or more devices, among other examples. The control device 230 may include a communication device and/or a computing device. For example, the control device 230 may include a computer, a server, a cloud computing device, a data source, or a similar type of device.

The network 240 includes one or more wired and/or wireless networks. For example, the network 240 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
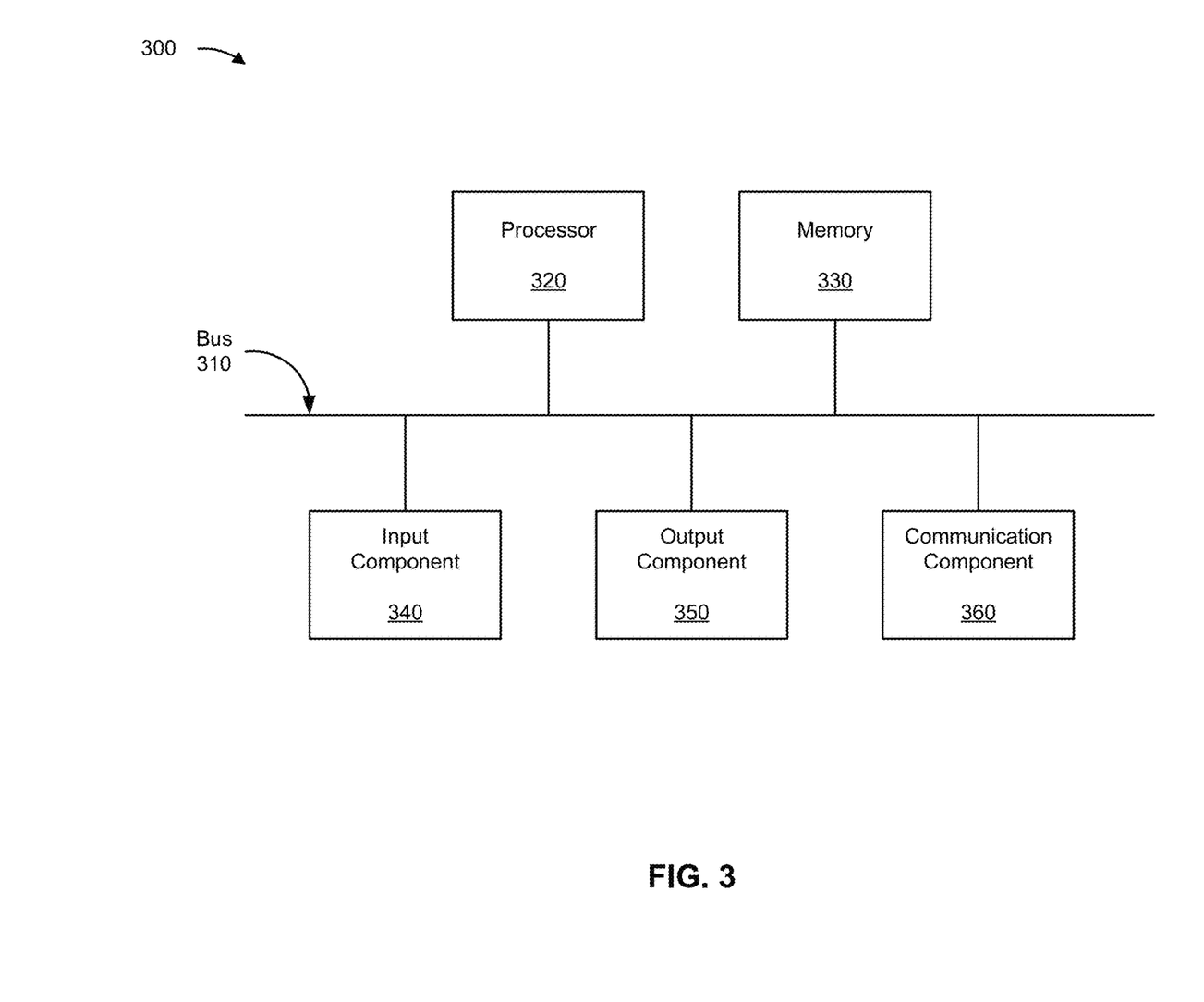
FIG. 3 is a diagram of example components of one or more devices of FIG. 2.

FIG. 3 is a diagram of example components of a device 300, which may correspond to router device 210, user device 220, and/or control device 230. In some implementations, router device 210, user device 220, and/or control device 230 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
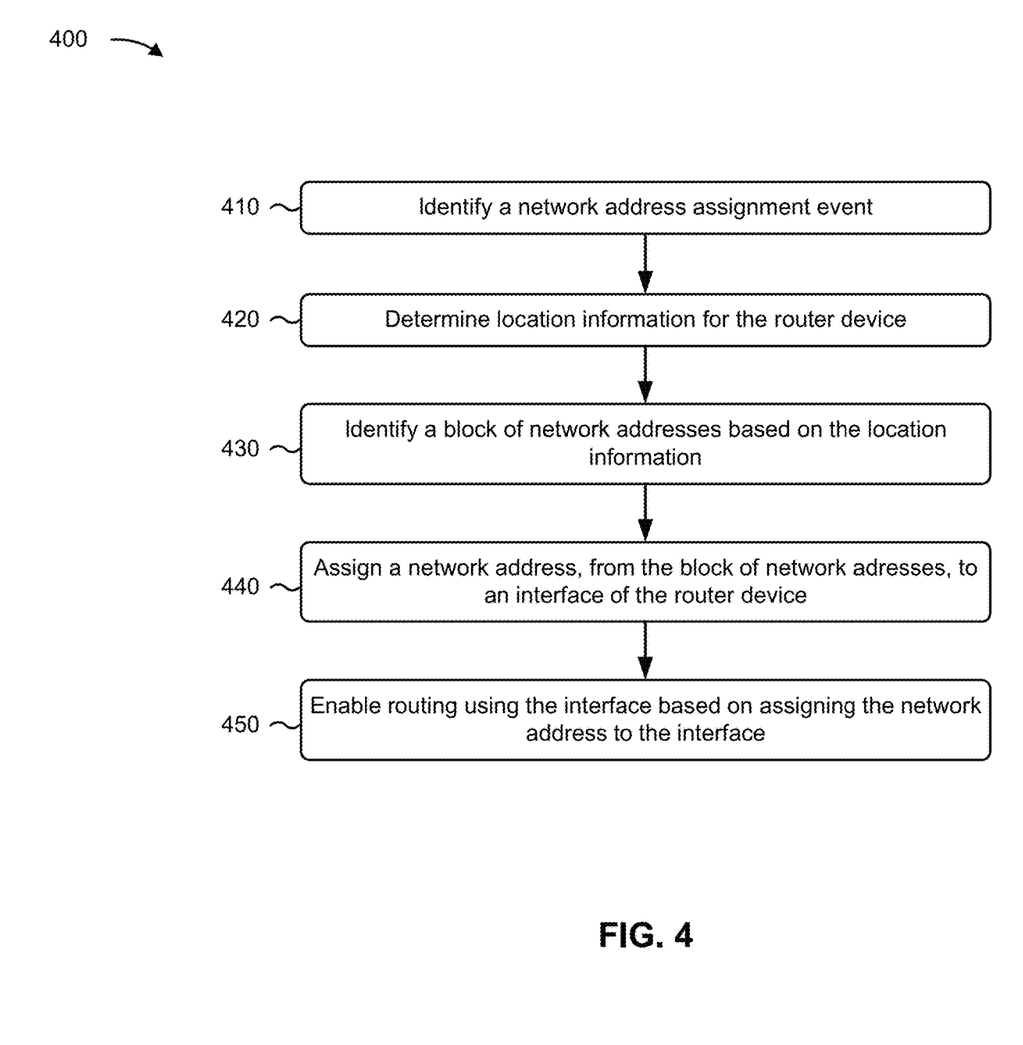
FIG. 4 is a flowchart of an example process relating to location-based assignment of network address information.

FIG. 4 is a flowchart of an example process 400 associated with location-based assignment of network address information. In some implementations, one or more process blocks of FIG. 4 may be performed by a router device (e.g., router device 105 or router device 210, among other examples). In some implementations, one or more process blocks of FIG. 4 may be performed by another device or a group of devices separate from or including the router device, such as a user device (e.g., user device 110 or user device 220) and/or a control device (e.g., control device 120 or control device 230). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include identifying a network address assignment event (block 410). For example, the router device may identify a network address assignment event, as described above.

As further shown in FIG. 4, process 400 may include determining location information for the router device (block 420). For example, the router device may determine first location information for a deployment site of the router device based on identifying the network address assignment event. In some implementations, the first location information corresponds to a coordinate location, of the deployment site, within a coordinate location system, as described above. The router device may convert the first location information into second location information. In some implementations, the second location information corresponds to a region, of a set of defined regions, of the deployment site.

As further shown in FIG. 4, process 400 may include identifying a block of network addresses based on the location information (block 430). For example, the router device may identify a block of network addresses, of a group of blocks of network addresses, corresponding to the region of the set of defined regions, as described above. In some implementations, process 400 includes identifying, and based on a network address assignment template and the second location information, a subnet, where the subnet corresponds to the block of network addresses, and selecting the available network address comprises selecting the available network address from the subnet.

As further shown in FIG. 4, process 400 may include assigning a network address, from a block of network addresses, to an interface of the router device (block 440). For example, the router device may select, from the block of network addresses, an available network address for the router device. In this case, the router device may assign the available network address to an interface of the router device, as described above. In some implementations, process 400 includes validating the available network address, and where assigning the available network address includes assigning the available network address based on validating the available network address.

In some implementations, process 400 includes determining whether a network address assignment template is defined for the router device and assigning the available network address includes assigning the available network address based on the network address assignment template. In some implementations, determining whether the network address assignment template is defined for the router device includes determining whether the network address assignment template is defined for the router device based on a type of the router device.

In some implementations, determining whether the network address assignment template is defined for the router device includes determining that the network address assignment template is not defined for the router device, defining the network address assignment template for the router device, and providing the network address assignment template for storage in a data structure. In some implementations, defining the network address assignment template includes defining the network address assignment template based at least in part on a configuration of a set of interfaces of the router device.

As further shown in FIG. 4, process 400 may include enabling routing using the interface based on assigning the available network address to the interface (block 450). For example, the router device may enable routing using the interface based on assigning the available network address to the interface, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
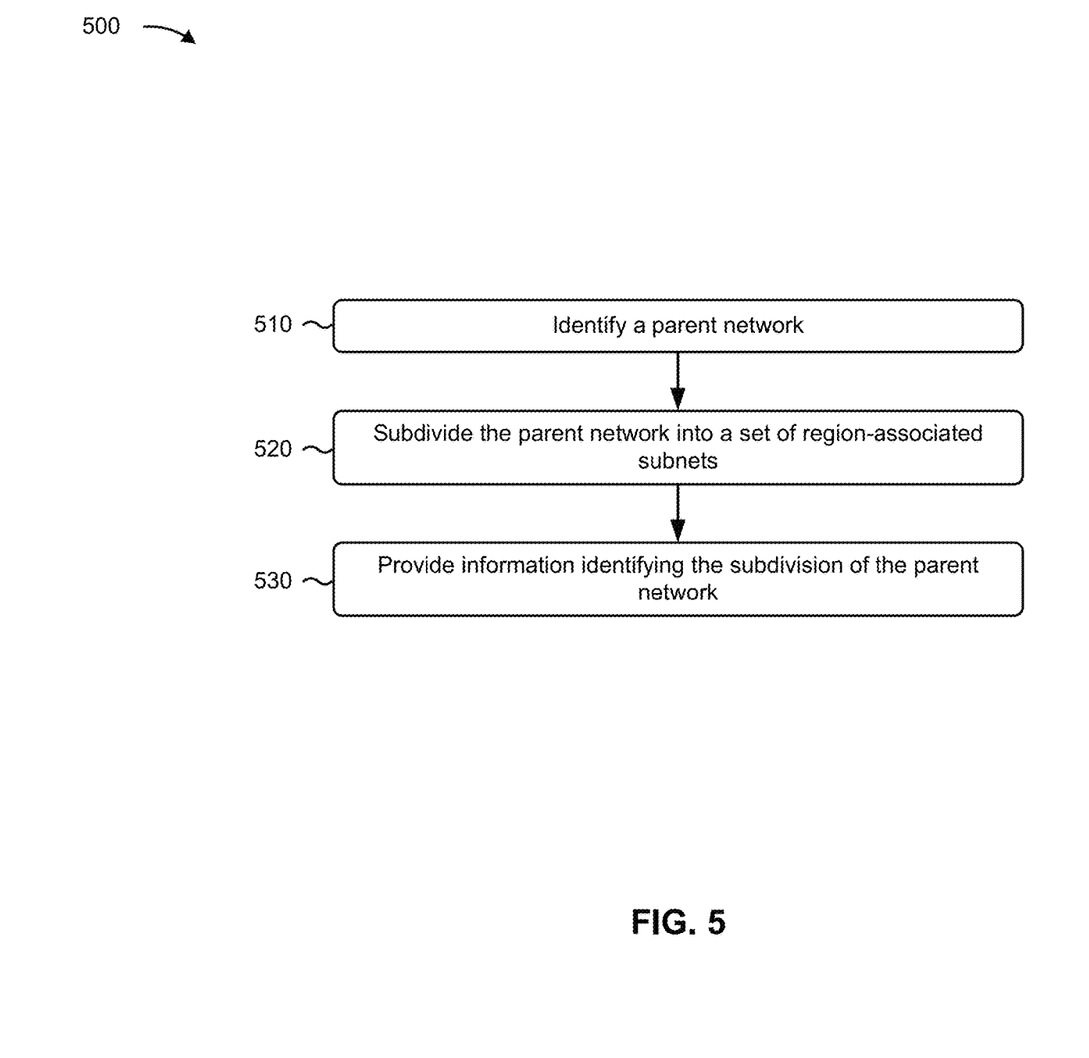
FIG. 5 is a flowchart of an example process relating to subdivision of a parent network into region-associated subnets.

FIG. 5 is a flowchart of an example process 500 associated with subdivision of a parent network into region-associated subnets. In some implementations, one or more process blocks of FIG. 5 may be performed by a control device (e.g., control device 230, among other examples). In some implementations, one or more process blocks of FIG. 5 may be performed by another device or a group of devices separate from or including the control device, such as a user device (e.g., user device 110 or user device 220) and/or a router device (e.g., router device 105 or router device 210). Additionally, or alternatively, one or more process blocks of FIG. 5 may be performed by one or more components of device 300, such as processor 320, memory 330, input component 340, output component 350, and/or communication component 360.

As shown in FIG. 5, process 500 may include identifying a parent network (block 510). For example, the control device may identify a parent network, as described above. In some implementations, the control device may receive information identifying one or more parameters of the parent network, such as a subnet of the parent network, a set of hosts of the parent network, or a range of IP addresses of the parent network, among other examples. In some aspects, the parent network is a child network of another parent network. For example, as described herein, the control device may divide the parent network into multiple child networks, but the parent network may be a child network of another parent network. In other words, a parent network may include multiple child networks that are subdivisions of the parent network, and a child network, of the multiple child networks, may include multiple sub-child networks that are subdivisions of the child network.

As shown in FIG. 5, process 500 may include subdividing the parent network into a set of region-associated subnets (block 520). For example, the control device may subdivide the parent network into multiple child networks and each child network may be associated with a region, as described above. The control device may assign a subset of hosts and/or a sub-range of IP addresses of the parent network to each of the multiple child networks. Each child network may have the same or different quantities of hosts or sizes of a range of IP addresses, among other parameters. In some implementations, the control device may select a set of regions for which to define subnets based at least in part on a deployment of network resources. For example, the control device may determine that network resources are to be deployed in a particular set of regions and may define subnets for the particular set of regions. In some implementations, the control device may periodically update the set of subnets by further subdivision the set of subnets, defining new subnets, or removing subnets based on changes to a deployment pattern or network architecture, thereby maintaining region-associated subnets.

As shown in FIG. 5, process 500 may include providing information identifying subdivisions of the parent network (block 530). For example, the control device may provide information to a router device identifying the subdivisions of the parent network, as described above. The router device may assign IP addresses from the region-associated subnets based on a region in which the router device is deployed.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    identifying, by a router device, a network address assignment event;
    determining, by the router device, first location information for a deployment site of the router device based on identifying the network address assignment event, wherein the first location information corresponds to a coordinate location, of the deployment site, within a coordinate location system;
    converting, by the router device, the first location information into second location information, wherein the second location information corresponds to a region, of a set of defined regions, of the deployment site;
    identifying, by the router device, a block of network addresses, of a group of blocks of network addresses, corresponding to the region of the set of defined regions;
    selecting, by the router device and from the block of network addresses, an available network address for the router device;
    determining, by the router device, whether a network address assignment template is defined for the router device based on a type of the router device;
    assigning, by the router device, the available network address to an interface of the router device based on the network address assignment template; and
    enabling, by the router device, routing using the interface based on assigning the available network address to the interface.

2. The method of claim 1, wherein the network address assignment event includes one or more of: installation of the router device, relocation of the router device, changing of dynamic interface configuration of the router device and installation of additional interfaces on the router device.

3. The method of claim 1, wherein determining, by the router device, whether the network address assignment template is defined for the router device comprises:

determining, by the router device, that the network address assignment template is not defined for the router device;
defining, by the router device, the network address assignment template for the router device; and
providing, by the router device, the network address assignment template for storage in a data structure.

4. The method of claim 3, wherein defining, by the router device, the network address assignment template comprises:
defining, by the router device, the network address assignment template based at least in part on a configuration of a set of interfaces of the router device.

5. The method of claim 1, further comprising:
identifying, by the router device and based on the network address assignment template and the second location information, a subnet, wherein the subnet corresponds to the block of network addresses; and
wherein selecting, by the router device, the available network address comprises:
selecting the available network address from the subnet.

6. The method of claim 1, further comprising:
validating, by the router device, the available network address; and
wherein assigning, by the router device, the available network address comprises:
assigning, by the router device, the available network address based on validating the available network address.

7. A non-transitory computer-readable medium storing a set of instructions, the set of instructions comprising:
one or more instructions that, when executed by one or more processors of a router device, cause the router device to:
determine a location for a deployment site of the router device using a geolocation function of the router device;
identify a network address assignment template for a type of the router device, wherein the network address assignment template defines an assignment pattern of network addresses, of a block of network addresses corresponding to the location, to interfaces of the router device
assign the network addresses to the interfaces of the router device in accordance with the network address assignment template; and
activate routing using the interfaces of the router device based on assigning the network addresses to the interfaces.

8. The computer-readable medium of claim 7, the instructions further causing the routing device to:
identify a network address assignment event,
wherein determining the location is based on identifying the network address assignment event, and wherein the network address assignment event includes one or more of installation of the router device, relocation of the router device, changing of dynamic interface configuration of the router device, and installation of additional interfaces on the router device.

9. The non-transitory computer-readable medium of claim 7, wherein the one or more instructions further cause the router device to:
register network address records of the assignment of the network addresses to the router device.

10. The non-transitory computer-readable medium of claim 7, wherein the one or more instructions further cause the router device to:
mark, in a log file, the assignment of the network addresses.

11. The non-transitory computer-readable medium of claim 7, wherein the one or more instructions, that cause the router device to assign the network addresses, cause the router device to:
select the network addresses based on a content of a log file identifying one or more assignments of one or more network addresses.

12. The non-transitory computer-readable medium of claim 7, wherein the one or more instructions, that cause the router device to assign the network addresses, cause the router device to:
select one or more network addresses, from the block of network addresses, for one or more interfaces of the router device.

13. The non-transitory computer-readable medium of claim 7, wherein the network addresses are Internet Protocol (IP) addresses.

14. A router device, comprising:
one or more processors configured to:
determine a location for a deployment site of the router device, wherein the location corresponds to a region, of a set of defined regions, of the deployment site;
identify a block of network addresses, of a group of blocks of network addresses, corresponding to the region of the set of defined regions;
select, from the block of network addresses, an available network address for the router device;
determining, by the router device, whether a network address assignment template is defined for the router device based on a type of the router device;
assign the available network address to an interface of the router device based on the network address assignment template; and
enable routing using the interface based on assigning the available network address to the interface.

15. The router device of claim 14, the one or more processors further configured to:
identify a network address assignment event,
wherein determining the first location information is based on identifying the network address assignment event, and wherein the network address assignment event includes one or more of installation of the router device, relocation of the router device, changing of dynamic interface configuration of the router device and installation of additional interfaces on the router device.

16. The router device of claim 14, wherein the available network address is an Internet Protocol (IP) address.

17. The router device of claim 14, wherein the router is a cell site router.

18. The router device of claim 14, wherein the one or more processors, to determine the location, are configured to:
determine a common language location identifier (CLLI) code or a local access and transport area (LATA).

19. The router device of claim 14, wherein the one or more processors, to determine the location, are configured to:
determine at least one of a latitude or a longitude.

20. The router device of claim 14, wherein the one or more processors, to determine the location, are configured to:

detect a coordinate location using a geolocation function of the router device.

* * * * *